April 1, 1941.    E. LEMMERS    2,237,184
ALLOY
Filed April 13, 1938
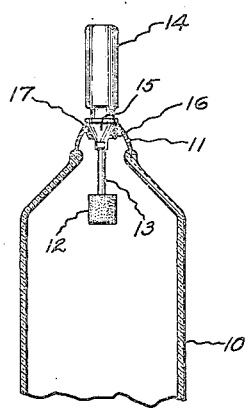
Inventor:
Eugene Lemmers,
by Harry E. Dunham
His Attorney.

Patented Apr. 1, 1941

2,237,184

UNITED STATES PATENT OFFICE 2,237,184

ALLOY

Eugene Lemmers, Cleveland Heights, Ohio, assignor to General Electric Company, a corporation of New York Application April 13, 1938, Serial No. 201,788

4 Claims. (Cl. 250—27.5)

My invention relates to alloys generally, and more particularly to brazing alloys. Still more particularly, my invention relates to brazing alloys for use in uniting metallic members exposed to mercury vapor in such devices, for example, as electric mercury vapor discharge lamps, rectifiers and switches.

One of the objects of my invention is to provide a brazing alloy which will not amalgamate with mercury and none of the constituents of which will be leached out when in contact with mercury or mercury vapor at temperatures in excess of 400° C. Another object is to produce such an alloy which will have a melting point, or will flow freely, at a temperature below 1350° C. so that it will "wet" to the metals to be joined together at a temperature safely below the melting point of said metals. Another object is to produce such an alloy which will produce a clean strong joint which is vacuum-tight. Other objects and advantages of my invention will appear from the following description.

According to my invention, the above objects are fulfilled by an alloy of nickel and manganese. The manganese content should not be less than 12 per cent since a lesser amount raises the melting point too high. On the other hand, the manganese content should be less than 40 per cent since so high an amount of manganese produces an alloy which is too brittle and is too easily sheared. Very good results have been obtained with an alloy containing from 13 to 20 per cent manganese, the remainder being nickel, and especially with an alloy consisting of 20 per cent manganese and 80 per cent nickel.

The alloy may be prepared by a novel method which comprises placing powdered or broken manganese metal of the correct per cent by weight in a boat along with the proper amount of nickel. This boat or crucible should preferably be made of magnesia or at least be lined with magnesia. Such materials as clay, silica, zirconia, alumina, porcelain, sillimanite, etc., are not desirable because they are likely to contaminate the alloy to such an extent as to render it unfit for vacuum-tight strong brazing. The boat is then heated in a furnace at a temperature of approximately 1450° C., the furnace containing a reducing atmosphere, such as hydrogen. The heating time may be of the order of ten to fifteen minutes. After solidifying, the ingot is remelted and the batch is allowed to freeze or solidify in an atmosphere of inert gas, such as argon or nitrogen. This is done because, when melted, nickel holds hydrogen in solution and the hydrogen is given off upon solidification, thus causing blow holes and producing a casting unsuitable for working into wire or rod as used in brazing. By reheating and solidifying in an inert gas, the blow holes are eliminated.

The alloy has also been made under vacuum, but this procedure is not preferred because of the uncommonness of vacuum furnaces which attain a temperature of 1450° C. and also because of the fact that a considerable quantity of the manganese volatilizes out before alloying with the nickel.

For an illustration of one application of the brazing alloy comprising my invention, I have shown in the drawing an elevation, partly in section, of one end of an electric discharge lamp of the type described and claimed in my application Serial No. 169,829, filed October 19, 1937, having metallic members joined together by the alloy.

The lamp shown in the drawing is of the high intensity mercury type operating with a constricted arc discharge and comprises an envelope 10 of hard glass containing a quantity of mercury and having sealed to the end thereof a thin flexible metallic cup-shaped closure member 11 which may be made of an iron-nickel-cobalt alloy known as "Fernico." An electrode 12 is attached to a lead-in wire 13 which, in turn, is secured to a prong member 14 having a conical shoulder portion 15 which is secured to an inwardly turned flange 16 at the upper end of cup member 11 by a quantity 17 of the nickel-manganese brazing alloy comprising my invention which produces a clean strong vacuum-tight joint. The alloy is not affected by the mercury vapor in the lamp during operation thereof, unlike alloys containing copper which amalgamates with the mercury. The sealing or brazing may be performed by assembling the cup 11 and prong in the position shown in the drawing, placing a wire ring or loop of the alloy on the upper end of said cup 11 around the prong shoulder 15, and then placing the assembly in a furnace containing an inert or reducing atmosphere to cause the alloy to be melted and flow into the space between flange 16 and shoulder 15.

It will be obvious to those skilled in the art that the alloy comprising my invention has many other uses where it is desired to employ a brazing material which is unaffected by mercury, as in various types of electric discharge apparatus such as mercury rectifiers or in sealing the exhaust opening in devices comprising metallic closure portions, such as mercury switches.

What I claim as new and desire to secure by Letters Patent of the United States is:

1. In an electrical device containing mercury, metallic members exposed to the said mercury and united together by a brazing alloy containing at least 12 per cent and less than 40 per cent manganese, the remainder of said alloy being nickel.

2. In an electrical device containing mercury, metallic members exposed to the said mercury and united together by a brazing alloy containing about 13 per cent to 20 per cent manganese, the remainder of said alloy being nickel.

3. A seal between metallic parts consisting of an alloy containing at least 12 per cent and less than 40 per cent manganese, the remainder of said alloy being nickel.

4. A seal between metal parts consisting of an alloy containing about 13 per cent to 20 per cent manganese, the remainder of said alloy being nickel.

EUGENE LEMMERS.